(No Model.)

F. B. KENDALL.
NUT LOCK.

No. 244,256. Patented July 12, 1881.

Witnesses
Fred G. Dieterich
A. H. Krause

Inventor.
Francis B. Kendall
By W. B. Richards
atty

N. PETERS, Photo-Lithographer, Washington, D. C.

UNITED STATES PATENT OFFICE.

FRANCIS B. KENDALL, OF MONMOUTH, ILLINOIS.

NUT-LOCK.

SPECIFICATION forming part of Letters Patent No. 244,256, dated July 12, 1881.

Application filed October 29, 1880. (No model.)

*To all whom it may concern:*

Be it known that I, FRANCIS B. KENDALL, a citizen of the United States, residing at Monmouth, in the county of Warren and State of Illinois, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
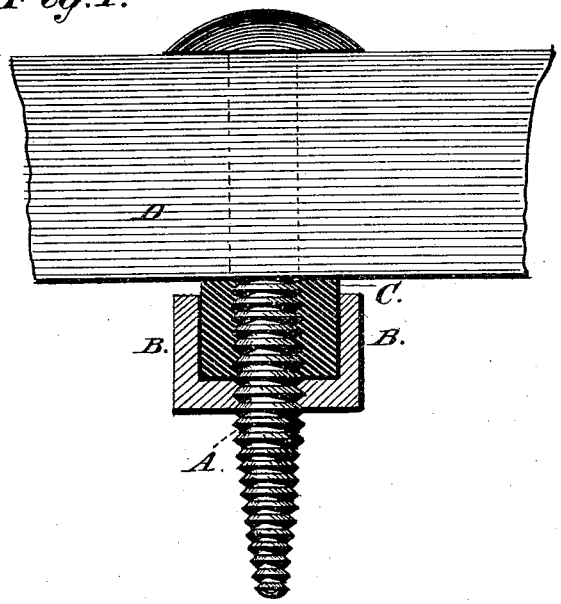
Figure 2:
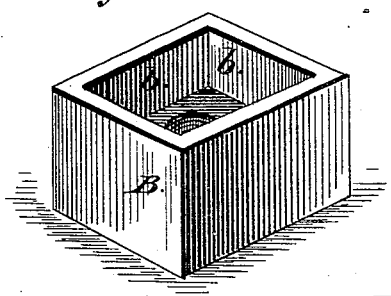
Figure 4:
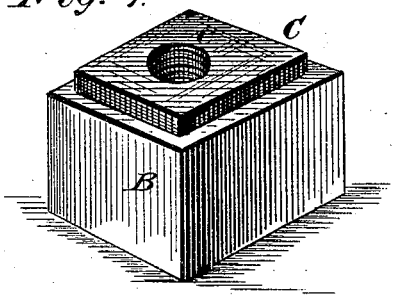
Figure 3:
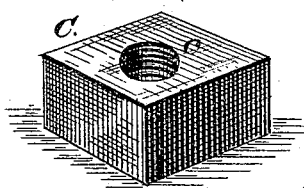

Figure 1 is a side elevation, partly in section, of a construction embodying my invention. Fig. 2 is a perspective of the nut. Fig. 3 is a perspective of the elastic rubber. Fig. 4 is a perspective of the nut with the rubber seated therein.

This invention is an improvement in devices for locking nuts on screw-bolts, to prevent them being loosened by jarring or tremulous motion of the parts received from any cause; and the invention consists in a block of elastic rubber seated in a recess or cavity in the side of the nut, so that in turning the nut to screw it down into place the rubber block will be turned with it and compressed between the nut and part through which the bolt passes, and by its adhesion to said part, and the constant pressure that it exerts on the nut lengthwise of the bolt, will prevent the nut being loosened by ordinary jarring.

The invention further consists in special features of construction and adaption of the parts to form a more perfect lock, as hereinafter described, and set forth in the claims hereto annexed.

Referring to the drawings by letters, A represents a bolt threaded for the reception of a nut, B. The nut B has a cavity or recess, *b*, in one side, which is square in its cross-section, as shown in the drawings.

C is a block of elastic rubber fitted to the cavity or recess *b* so as to project slightly beyond the nut, as shown at Figs. 1 and 4, and has a central hole, *c*, through which the bolt A passes.

D may represent any parts through which the bolt passes to secure them.

In screwing the nut down into place the rubber C will be compressed between the nut and the parts D, and thereby exert a constant force backward on the nut, which, together with the adhesion of the rubber C to the part D, will prevent the nut being jarred loose by ordinary jarring.

By using a bolt with a tapering end, as shown at Fig. 1, and a rubber, C, with a hole, *c*, somewhat smaller than the main threaded portion of the bolt, the bolt may be forced into the rubber as the nut and rubber are screwed onto the bolt, and thereby spread the rubber and force it outward against the walls of the cavity *b*, and at the same time increase the locking powers of the rubber by its tightness on and adhesion to the threaded bolt. The tapering bolt will also cut a screw-thread in the small hole in the rubber, and thus facilitate screwing the rubber forward on the bolt along with the nut.

The rubber C may be square in its cross-section, as shown in the drawings, or it may be any other polygonal or other shaped form that will hold it and force it to rotate with the rotation of the nut on the bolt.

Having thus described my invention, what I claim as new, and desire to secure by Letters Patent, is—

1. A nut-lock consisting of a nut having a cavity in one side filled by a polygonal rubber block, C, which projects beyond the nut and has a hole for the reception of the bolt, operating in combination, substantially as described.

2. In combination with a nut, B, having a cavity, *b*, a rubber block, C, seated in said cavity and which projects beyond said nut, and provided with a hole, *c*, somewhat smaller than the main threaded portion of the bolt, and a tapering bolt, A, adapted to enter the hole *c* and force the rubber outward against the walls of the cavity *b*, substantially as and for the purpose specified.

In testimony whereof I affix my signature in presence of two witnesses.

FRANCIS B. KENDALL.

Witnesses:
W. J. WALKER,
D. M. KENDALL.